US009199879B2

(12) United States Patent
Thaemlitz et al.

(10) Patent No.: US 9,199,879 B2
(45) Date of Patent: Dec. 1, 2015

(54) WELL TREATMENT COMPOSITIONS AND METHODS UTILIZING NANO-PARTICLES

(75) Inventors: Carl J. Thaemlitz, Cypress, TX (US); Craig W. Roddy, Duncan, OK (US); Ricky L. Covington, Frisco, TX (US); Jiten Chatterji, Duncan, OK (US); D. Chad Brenneis, Marlow, OK (US)

(73) Assignee: Halliburton Energy Serives, Inc., Houston, TX (US)

( * ) Notice: Subject to any disclaimer, the term of this patent is extended or adjusted under 35 U.S.C. 154(b) by 0 days.

(21) Appl. No.: 13/458,112

(22) Filed: Apr. 27, 2012

(65) Prior Publication Data

US 2012/0211227 A1 Aug. 23, 2012

Related U.S. Application Data

(63) Continuation-in-part of application No. 12/567,782, filed on Sep. 27, 2009, now Pat. No. 8,586,512, which is a continuation-in-part of application No. 12/263,954, filed on Nov. 3, 2008, which is a continuation-in-part of application No. 11/747,002, filed on May 10, 2007, now Pat. No. 7,559,369.

(51) Int. Cl.
| | |
|---|---|
| *C09K 8/42* | (2006.01) |
| *E21B 43/16* | (2006.01) |
| *E21B 23/00* | (2006.01) |
| *C04B 20/00* | (2006.01) |
| *C04B 28/02* | (2006.01) |
| *C04B 28/08* | (2006.01) |
| *C09K 8/46* | (2006.01) |
| *C09K 8/473* | (2006.01) |
| *C09K 8/487* | (2006.01) |
| *C09K 8/504* | (2006.01) |
| *C09K 8/516* | (2006.01) |
| *C09K 8/03* | (2006.01) |
| *C09K 8/502* | (2006.01) |
| *C04B 111/00* | (2006.01) |

(52) U.S. Cl.
CPC .............. *C04B 20/008* (2013.01); *C04B 28/02* (2013.01); *C04B 28/08* (2013.01); *C09K 8/032* (2013.01); *C09K 8/46* (2013.01); *C09K 8/473* (2013.01); *C09K 8/487* (2013.01); *C09K 8/502* (2013.01); *C09K 8/5045* (2013.01); *C09K 8/516* (2013.01); *C04B 2111/00146* (2013.01); *C09K 2208/10* (2013.01); *Y02W 30/92* (2015.05); *Y02W 30/94* (2015.05); *Y02W 30/95* (2015.05)

(58) Field of Classification Search
None
See application file for complete search history.

(56) References Cited

U.S. PATENT DOCUMENTS

| | | |
|---|---|---|
| 2,094,316 A | 9/1937 | Cross et al. |
| 2,329,940 A | 9/1943 | Ponzer |
| 2,842,205 A | 7/1958 | Allen et al. |
| 2,848,051 A | 8/1958 | Willaims |
| 2,857,286 A | 10/1958 | Striker |
| 2,871,133 A | 1/1959 | Palonen et al. |
| 2,880,096 A | 3/1959 | Hurley |
| 2,890,169 A | 6/1959 | Prokop |
| 2,933,135 A | 4/1960 | Johnson |
| 2,945,769 A | 7/1960 | Gama et al. |
| 2,952,318 A | 9/1960 | Ritch |
| 2,959,223 A | 11/1960 | Harmon et al. |
| 2,978,024 A | 4/1961 | Davis |
| 3,026,938 A | 3/1962 | Huitt et al. |
| 3,079,268 A | 2/1963 | Brooks |
| 3,168,139 A | 2/1965 | Kennedy et al. |
| 3,219,112 A | 11/1965 | Sauber et al. |
| 3,336,979 A | 8/1967 | Ingraham et al. |
| 3,353,601 A | 11/1967 | Dollarhide et al. |
| 3,366,177 A | 1/1968 | Powers et al. |
| 3,381,748 A | 5/1968 | Peters et al. |
| 3,454,095 A | 7/1969 | Messenger et al. |
| 3,467,193 A | 9/1969 | Messenger |
| 3,499,491 A | 3/1970 | Wyant et al. |
| 3,557,876 A | 1/1971 | Tragesser |
| 3,607,326 A | 9/1971 | Serafin |
| RE27,271 E | 1/1972 | Hamsberger et al. |
| 3,748,159 A | 7/1973 | George |
| 3,854,985 A | 12/1974 | Suzuki et al. |
| 3,876,005 A | 4/1975 | Fincher et al. |
| 3,877,522 A | 4/1975 | Knight et al. |
| 3,887,009 A | 6/1975 | Miller et al. |
| 3,887,385 A | 6/1975 | Quist et al. |
| 3,888,311 A | 6/1975 | Cooke, Jr. |

(Continued)

FOREIGN PATENT DOCUMENTS

| | | | |
|---|---|---|---|
| CA | 2514492 | 9/2004 | |
| CA | 2153372 A1 | 1/2006 | .............. C04B 18/12 |

(Continued)

OTHER PUBLICATIONS

Bartlet-Gouedard, "A Non-Conventional Way of Developing Cement Slurry for Geothermal Wells", 2001.

(Continued)

*Primary Examiner* — John J Figueroa
(74) *Attorney, Agent, or Firm* — Craig W. Roddy; Tumey L.L.P.

(57) ABSTRACT

Disclosed embodiments relate to well treatment fluids and methods that utilize nano-particles. Exemplary nano-particles are selected from the group consisting of particulate nano-silica, nano-alumina, nano-zinc oxide, nano-boron, nano-iron oxide, and combinations thereof. Embodiments also relate to methods of cementing that include the use of nano-particles. An exemplary method of cementing comprises introducing a cement composition into a subterranean formation, wherein the cement composition comprises cement, water and a particulate nano-silica. Embodiments also relate to use of nano-particles in drilling fluids, completion fluids, simulation fluids, and well clean-up fluids.

17 Claims, No Drawings

(56) References Cited

U.S. PATENT DOCUMENTS

| | | |
|---|---|---|
| 3,958,638 A | 5/1976 | Johnston |
| 4,018,617 A | 4/1977 | Nicholson |
| 4,031,184 A | 6/1977 | McCord |
| 4,036,301 A | 7/1977 | Powers et al. |
| 4,142,910 A | 3/1979 | Kraemer et al. |
| 4,176,720 A | 12/1979 | Wilson |
| 4,202,413 A | 5/1980 | Messenger |
| 4,202,795 A | 5/1980 | Burnham et al. |
| 4,235,291 A | 11/1980 | Messenger |
| 4,268,316 A | 5/1981 | Wills, Jr. |
| 4,274,881 A | 6/1981 | Langton et al. |
| 4,284,433 A | 8/1981 | Aignesberger et al. |
| 4,341,562 A | 7/1982 | Ahlbeck |
| 4,353,746 A | 10/1982 | Birchall et al. |
| RE31,190 E | 3/1983 | Detroit et al. |
| 4,400,474 A | 8/1983 | Copperthwaite et al. |
| 4,407,677 A | 10/1983 | Wills |
| 4,432,800 A | 2/1984 | Kneller et al. |
| 4,435,216 A | 3/1984 | Diehl et al. |
| 4,460,292 A | 7/1984 | Durham et al. |
| 4,494,990 A | 1/1985 | Harris |
| 4,506,734 A | 3/1985 | Nolte |
| 4,515,216 A | 5/1985 | Childs et al. |
| 4,515,635 A | 5/1985 | Rao et al. |
| 4,519,452 A | 5/1985 | Tsao et al. |
| 4,555,269 A | 11/1985 | Rao et al. |
| 4,614,599 A | 9/1986 | Walker |
| 4,624,711 A | 11/1986 | Styron |
| 4,633,950 A | 1/1987 | Delhommer et al. |
| 4,643,362 A | 2/1987 | Serafin |
| 4,650,520 A * | 3/1987 | Johnsen et al. .............. 106/639 |
| 4,660,642 A | 4/1987 | Young |
| 4,676,317 A | 6/1987 | Fry et al. |
| 4,676,832 A | 6/1987 | Childs et al. |
| 4,700,777 A | 10/1987 | Luers |
| 4,711,401 A | 12/1987 | Serafin |
| 4,721,160 A | 1/1988 | Parcevaux et al. |
| 4,741,401 A | 5/1988 | Walles et al. |
| 4,741,782 A | 5/1988 | Styron |
| 4,770,796 A | 9/1988 | Jacobs |
| 4,784,223 A | 11/1988 | Worrall et al. |
| 4,822,421 A | 4/1989 | Crabb |
| 4,848,973 A | 7/1989 | Yokota et al. |
| 4,883,125 A | 11/1989 | Wilson et al. |
| 4,941,536 A | 7/1990 | Brothers et al. |
| 4,953,620 A | 9/1990 | Bloys et al. |
| 4,961,790 A | 10/1990 | Smith et al. |
| 4,992,102 A | 2/1991 | Barbour |
| 5,030,366 A | 7/1991 | Wilson et al. |
| 5,049,288 A | 9/1991 | Brothers et al. |
| 5,058,679 A | 10/1991 | Hale et al. |
| RE33,747 E | 11/1991 | Hartley et al. |
| 5,086,850 A | 2/1992 | Harris et al. |
| 5,102,558 A | 4/1992 | McDougall et al. |
| 5,121,795 A * | 6/1992 | Ewert et al. .................... 166/292 |
| 5,123,487 A * | 6/1992 | Harris et al. ................... 166/277 |
| 5,125,455 A | 6/1992 | Harris et al. |
| 5,127,473 A * | 7/1992 | Harris et al. ................... 166/277 |
| 5,149,370 A * | 9/1992 | Olaussen et al. .............. 166/292 |
| 5,151,203 A | 9/1992 | Riley et al. |
| 5,183,505 A | 2/1993 | Spinney |
| 5,203,629 A | 4/1993 | Valle et al. |
| 5,207,832 A | 5/1993 | Baffreau et al. |
| 5,213,160 A | 5/1993 | Nahm et al. |
| 5,236,501 A | 8/1993 | Nomachi et al. |
| 5,238,064 A | 8/1993 | Dahl et al. |
| 5,253,991 A | 10/1993 | Yokota et al. |
| 5,263,542 A * | 11/1993 | Brothers ...................... 166/293 |
| 5,266,111 A | 11/1993 | Barbour |
| 5,292,512 A | 3/1994 | Schaefer et al. |
| 5,295,543 A | 3/1994 | Terry et al. |
| 5,305,831 A | 4/1994 | Nahm |
| 5,314,022 A | 5/1994 | Cowan et al. |
| 5,320,851 A | 6/1994 | Mars et al. |
| 5,327,968 A | 7/1994 | Onan et al. |
| 5,337,824 A | 8/1994 | Cowan |
| 5,339,903 A | 8/1994 | Eoff et al. |
| 5,340,397 A | 8/1994 | Brothers |
| 5,346,012 A * | 9/1994 | Heathman et al. ............ 166/293 |
| 5,352,288 A | 10/1994 | Mallow |
| 5,358,044 A | 10/1994 | Hale et al. |
| 5,358,047 A | 10/1994 | Himes et al. |
| 5,358,049 A | 10/1994 | Hale et al. |
| 5,361,841 A | 11/1994 | Hale et al. |
| 5,361,842 A | 11/1994 | Hale et al. |
| 5,368,103 A | 11/1994 | Heathman et al. |
| 5,370,185 A | 12/1994 | Cowan et al. |
| 5,372,641 A | 12/1994 | Carpenter |
| 5,373,901 A | 12/1994 | Norman et al. |
| 5,375,661 A * | 12/1994 | Daneshy et al. .............. 166/278 |
| 5,382,290 A | 1/1995 | Nahm et al. |
| 5,383,521 A | 1/1995 | Onan et al. |
| 5,383,967 A | 1/1995 | Chase |
| 5,389,706 A * | 2/1995 | Heathman et al. ............ 166/293 |
| 5,398,758 A | 3/1995 | Onan et al. |
| 5,398,759 A * | 3/1995 | Rodrigues et al. ............ 166/293 |
| 5,423,379 A | 6/1995 | Hale et al. |
| 5,439,056 A | 8/1995 | Cowan |
| 5,454,867 A | 10/1995 | Brothers et al. |
| 5,456,751 A | 10/1995 | Zandi et al. |
| 5,458,195 A | 10/1995 | Totten et al. |
| 5,464,060 A | 11/1995 | Hale et al. |
| 5,472,051 A | 12/1995 | Brothers |
| 5,476,142 A | 12/1995 | Kajita |
| 5,476,144 A | 12/1995 | Nahm et al. |
| 5,484,480 A | 1/1996 | Styron |
| 5,494,513 A | 2/1996 | Fu et al. |
| 5,499,677 A | 3/1996 | Cowan |
| 5,509,962 A | 4/1996 | Tang |
| 5,515,921 A | 5/1996 | Cowan et al. |
| 5,518,996 A | 5/1996 | Maroy |
| 5,520,730 A | 5/1996 | Barbour |
| 5,529,624 A | 6/1996 | Riegler |
| 5,536,311 A | 7/1996 | Rodrigues |
| 5,542,782 A | 8/1996 | Carter et al. |
| 5,551,976 A | 9/1996 | Allen |
| 5,569,324 A | 10/1996 | Totten et al. |
| 5,575,841 A | 11/1996 | Dry |
| 5,580,379 A | 12/1996 | Cowan |
| 5,585,333 A | 12/1996 | Dahl et al. |
| 5,588,488 A | 12/1996 | Vijn et al. |
| 5,588,489 A | 12/1996 | Chatterji et al. |
| 5,603,961 A | 2/1997 | Suzuki et al. |
| 5,660,624 A | 8/1997 | Dry |
| 5,663,230 A | 9/1997 | Haman |
| 5,673,753 A | 10/1997 | Hale et al. |
| 5,688,844 A | 11/1997 | Chatterji et al. |
| 5,693,137 A | 12/1997 | Styron |
| 5,711,383 A | 1/1998 | Terry et al. |
| 5,716,910 A | 2/1998 | Totten et al. |
| 5,728,209 A | 3/1998 | Bury et al. |
| 5,728,654 A | 3/1998 | Dobson et al. |
| 5,741,357 A | 4/1998 | Sheikh |
| 5,766,323 A | 6/1998 | Butler et al. |
| 5,779,787 A | 7/1998 | Brothers et al. |
| 5,783,541 A | 7/1998 | Tack et al. |
| 5,795,060 A | 8/1998 | Stephens |
| 5,820,670 A | 10/1998 | Chatterji et al. |
| 5,851,960 A | 12/1998 | Totten et al. |
| 5,866,516 A | 2/1999 | Costin |
| 5,874,387 A | 2/1999 | Carpenter et al. |
| 5,879,699 A | 3/1999 | Lerner |
| 5,897,699 A | 4/1999 | Chatterji et al. |
| 5,900,053 A | 5/1999 | Brothers et al. |
| 5,913,364 A | 6/1999 | Sweatman |
| 5,988,279 A | 11/1999 | Udarbe et al. |
| 5,989,334 A | 11/1999 | Dry |
| 6,022,408 A | 2/2000 | Stokes et al. |
| 6,027,561 A | 2/2000 | Gruber et al. |
| 6,060,434 A | 5/2000 | Sweatman et al. |
| 6,060,535 A | 5/2000 | Villar et al. |
| 6,063,738 A | 5/2000 | Chatterji et al. |
| 6,138,759 A | 10/2000 | Chatterji et al. |
| 6,143,069 A | 11/2000 | Brothers et al. |

(56) References Cited

U.S. PATENT DOCUMENTS

| | | | |
|---|---|---|---|
| 6,145,591 | A | 11/2000 | Boncan et al. |
| 6,153,562 | A | 11/2000 | Villar et al. |
| 6,167,967 | B1 | 1/2001 | Sweatman |
| 6,170,575 | B1 | 1/2001 | Reddy et al. |
| 6,230,804 | B1 | 5/2001 | Mueller et al. |
| 6,244,343 | B1 | 6/2001 | Brothers et al. |
| 6,245,142 | B1 | 6/2001 | Reddy et al. |
| 6,258,757 | B1 | 7/2001 | Sweatman et al. |
| 6,261,360 | B1 | 7/2001 | Dry |
| 6,277,189 | B1 | 8/2001 | Chugh |
| 6,279,655 | B1 * | 8/2001 | Pafitis et al. ............... 166/294 |
| 6,312,515 | B1 | 11/2001 | Barlet-Gouedard et al. |
| 6,315,042 | B1 | 11/2001 | Griffith et al. |
| 6,332,921 | B1 | 12/2001 | Brothers et al. |
| 6,367,550 | B1 | 4/2002 | Chatterji et al. |
| 6,379,456 | B1 | 4/2002 | Heathman et al. |
| 6,390,197 | B1 | 5/2002 | Maroy |
| 6,402,833 | B1 | 6/2002 | O'Hearn et al. |
| 6,409,819 | B1 | 6/2002 | Ko |
| 6,444,316 | B1 | 9/2002 | Reddy et al. |
| 6,457,524 | B1 | 10/2002 | Roddy |
| 6,471,975 | B1 | 10/2002 | Banovetz et al. |
| 6,478,869 | B2 | 11/2002 | Reddy et al. |
| 6,488,089 | B1 | 12/2002 | Bour et al. |
| 6,488,763 | B2 | 12/2002 | Brothers et al. |
| 6,488,764 | B2 | 12/2002 | Westerman |
| 6,494,951 | B1 | 12/2002 | Reddy et al. |
| 6,500,252 | B1 | 12/2002 | Chatterji et al. |
| 6,500,253 | B2 | 12/2002 | Norman et al. |
| 6,502,636 | B2 | 1/2003 | Chatterji et al. |
| 6,508,305 | B1 | 1/2003 | Brannon et al. |
| 6,524,384 | B2 | 2/2003 | Griffith et al. |
| 6,527,051 | B1 | 3/2003 | Reddy et al. |
| 6,527,849 | B2 | 3/2003 | Dry |
| 6,547,871 | B2 | 4/2003 | Chatterji et al. |
| 6,547,891 | B2 | 4/2003 | Linden et al. |
| 6,554,067 | B1 | 4/2003 | Davies et al. |
| 6,554,071 | B1 | 4/2003 | Reddy et al. |
| 6,561,273 | B2 | 5/2003 | Brothers et al. |
| 6,562,122 | B2 | 5/2003 | Dao et al. |
| 6,565,647 | B1 | 5/2003 | Day et al. |
| 6,572,697 | B2 | 6/2003 | Gleeson et al. |
| 6,599,863 | B1 | 7/2003 | Palmer et al. |
| 6,610,139 | B2 | 8/2003 | Reddy et al. |
| 6,626,243 | B1 | 9/2003 | Go Boncan |
| 6,631,766 | B2 | 10/2003 | Brothers et al. |
| 6,632,527 | B1 | 10/2003 | McDaniel et al. |
| 6,645,288 | B1 | 11/2003 | Dargaud et al. |
| 6,645,290 | B1 | 11/2003 | Barbour |
| 6,648,962 | B2 | 11/2003 | Berke et al. |
| 6,656,265 | B1 | 12/2003 | Garnier et al. |
| 6,660,080 | B2 | 12/2003 | Reddy et al. |
| 6,666,268 | B2 | 12/2003 | Griffith et al. |
| 6,668,929 | B2 | 12/2003 | Griffith et al. |
| 6,689,208 | B1 | 2/2004 | Brothers |
| 6,702,044 | B2 | 3/2004 | Reddy et al. |
| 6,706,108 | B2 | 3/2004 | Polston |
| 6,716,282 | B2 | 4/2004 | Griffith et al. |
| 6,729,405 | B2 | 5/2004 | DiLullo et al. |
| 6,767,398 | B2 | 7/2004 | Trato |
| 6,776,237 | B2 | 8/2004 | Dao et al. |
| 6,796,378 | B2 | 9/2004 | Reddy et al. |
| 6,797,054 | B2 | 9/2004 | Chatterji et al. |
| 6,808,561 | B2 | 10/2004 | Genge |
| 6,811,603 | B2 | 11/2004 | Brothers et al. |
| 6,823,940 | B2 | 11/2004 | Reddy et al. |
| 6,832,651 | B2 | 12/2004 | Ravi et al. |
| 6,835,243 | B2 | 12/2004 | Brothers et al. |
| 6,837,316 | B2 | 1/2005 | Reddy et al. |
| 6,846,357 | B2 | 1/2005 | Reddy et al. |
| 6,848,519 | B2 | 2/2005 | Reddy et al. |
| 6,861,392 | B2 | 3/2005 | Shaarpour |
| 6,861,468 | B2 | 3/2005 | Yoshida et al. |
| 6,874,578 | B1 * | 4/2005 | Garnier et al. ............... 166/293 |
| 6,881,708 | B2 | 4/2005 | Reddy et al. |
| 6,883,609 | B2 * | 4/2005 | Drochon et al. ............... 166/292 |
| 6,887,833 | B2 | 5/2005 | Brothers et al. |
| 6,889,767 | B2 | 5/2005 | Reddy et al. |
| 6,902,001 | B2 | 6/2005 | Dargaud et al. |
| 6,904,971 | B2 | 6/2005 | Brothers et al. |
| 6,907,929 | B2 | 6/2005 | LeRoy-Delage et al. |
| 6,908,508 | B2 | 6/2005 | Brothers |
| 6,911,078 | B2 | 6/2005 | Barlet-Gouedard et al. |
| 6,926,081 | B2 | 8/2005 | Sweatman et al. |
| 6,962,201 | B2 | 11/2005 | Brothers |
| 7,007,755 | B2 | 3/2006 | Reddy et al. |
| 7,022,179 | B1 | 4/2006 | Dry |
| 7,026,272 | B2 | 4/2006 | Reddy et al. |
| 7,032,664 | B2 | 4/2006 | Lord et al. |
| 7,033,975 | B2 | 4/2006 | Baran et al. |
| 7,048,053 | B2 | 5/2006 | Santra et al. |
| 7,059,415 | B2 | 6/2006 | Bosma et al. |
| 7,077,203 | B1 | 7/2006 | Roddy et al. |
| 7,084,092 | B2 | 8/2006 | Patel et al. |
| 7,086,466 | B2 | 8/2006 | Roddy |
| 7,138,446 | B2 | 11/2006 | Reddy et al. |
| 7,143,828 | B2 | 12/2006 | Reddy et al. |
| 7,143,832 | B2 | 12/2006 | Freyer |
| 7,156,173 | B2 | 1/2007 | Mueller |
| 7,156,174 | B2 | 1/2007 | Roddy et al. |
| 7,172,022 | B2 | 2/2007 | Reddy et al. |
| 7,174,962 | B1 | 2/2007 | Roddy et al. |
| 7,199,086 | B1 | 4/2007 | Roddy et al. |
| 7,204,307 | B2 | 4/2007 | Roddy et al. |
| 7,204,310 | B1 | 4/2007 | Roddy et al. |
| 7,204,312 | B2 | 4/2007 | Roddy et al. |
| 7,213,646 | B2 | 5/2007 | Roddy et al. |
| 7,264,053 | B2 | 9/2007 | Vargo, Jr. et al. |
| 7,279,447 | B2 | 10/2007 | Lal et al. |
| 7,284,609 | B2 | 10/2007 | Roddy et al. |
| 7,284,611 | B2 | 10/2007 | Reddy et al. |
| 7,294,194 | B2 | 11/2007 | Reddy et al. |
| 7,296,597 | B1 | 11/2007 | Freyer et al. |
| 7,303,014 | B2 | 12/2007 | Reddy et al. |
| 7,335,252 | B2 | 2/2008 | Roddy et al. |
| 7,337,841 | B2 | 3/2008 | Ravi |
| 7,337,842 | B2 | 3/2008 | Roddy et al. |
| 7,338,923 | B2 | 3/2008 | Roddy et al. |
| 7,341,104 | B2 | 3/2008 | Roddy et al. |
| 7,351,279 | B2 | 4/2008 | Brothers |
| 7,353,870 | B2 | 4/2008 | Roddy et al. |
| 7,381,263 | B2 | 6/2008 | Roddy et al. |
| 7,387,675 | B2 | 6/2008 | Roddy et al. |
| 7,395,860 | B2 | 7/2008 | Roddy et al. |
| 7,404,440 | B2 | 7/2008 | Reddy et al. |
| 7,409,991 | B2 | 8/2008 | Reddy et al. |
| 7,422,060 | B2 | 9/2008 | Hammami et al. |
| 7,424,913 | B2 | 9/2008 | Roddy |
| 7,445,668 | B2 | 11/2008 | Sommain |
| 7,445,669 | B2 | 11/2008 | Roddy et al. |
| 7,451,817 | B2 | 11/2008 | Reddy et al. |
| 7,461,696 | B2 | 12/2008 | Nguyen et al. |
| 7,478,675 | B2 | 1/2009 | Roddy et al. |
| 7,482,309 | B2 | 1/2009 | Ravi et al. |
| 7,559,369 | B2 | 7/2009 | Roddy et al. |
| 7,776,797 | B2 | 8/2010 | Allin et al. |
| 7,784,542 | B2 | 8/2010 | Roddy et al. |
| 7,806,183 | B2 | 10/2010 | Roddy et al. |
| 7,846,876 | B2 | 12/2010 | Koyanagi |
| 7,892,352 | B2 | 2/2011 | Roddy et al. |
| 8,114,820 | B2 | 2/2012 | Crews |
| 8,226,879 | B2 | 7/2012 | Genolet et al. |
| 8,394,744 | B2 | 3/2013 | Woytowich et al. |
| 8,476,203 | B2 | 7/2013 | Patil et al. |
| 8,499,837 | B2 | 8/2013 | Koons |
| 8,586,512 | B2 | 11/2013 | Roddy et al. |
| 8,598,093 | B2 | 12/2013 | Roddy et al. |
| 8,603,952 | B2 | 12/2013 | Roddy et al. |
| 8,609,595 | B2 | 12/2013 | Morgan et al. |
| 8,685,903 | B2 | 4/2014 | Ravi et al. |
| 2002/0004464 | A1 | 1/2002 | Nelson et al. |
| 2002/0033121 | A1 | 3/2002 | Marko |
| 2002/0073894 | A1 | 6/2002 | Genge et al. |
| 2002/0073897 | A1 | 6/2002 | Trato |

(56) References Cited

U.S. PATENT DOCUMENTS

| | | |
|---|---|---|
| 2002/0117090 A1 | 8/2002 | Ku |
| 2002/0193257 A1 | 12/2002 | Lee et al. |
| 2003/0089281 A1 | 5/2003 | Berke et al. |
| 2003/0095906 A1 | 5/2003 | Bauer et al. |
| 2003/0116065 A1 | 6/2003 | Griffith et al. |
| 2003/0116887 A1 | 6/2003 | Scott |
| 2003/0134751 A1 | 7/2003 | Lee et al. |
| 2003/0167970 A1 | 9/2003 | Polston |
| 2003/0168215 A1* | 9/2003 | Drochon et al. .......... 166/276 |
| 2003/0220204 A1 | 11/2003 | Bara et al. |
| 2003/0234103 A1* | 12/2003 | Lee et al. ............. 166/293 |
| 2004/0007162 A1 | 1/2004 | Morioka et al. |
| 2004/0040475 A1 | 3/2004 | De La Roij et al. |
| 2004/0055748 A1 | 3/2004 | Reddy et al. |
| 2004/0079260 A1 | 4/2004 | Datta et al. |
| 2004/0107877 A1 | 6/2004 | Getzlaf et al. |
| 2004/0108113 A1 | 6/2004 | Luke et al. |
| 2004/0112600 A1 | 6/2004 | Luke et al. |
| 2004/0121916 A1 | 6/2004 | Kono et al. |
| 2004/0144537 A1 | 7/2004 | Reddy et al. |
| 2004/0171499 A1 | 9/2004 | Ravi et al. |
| 2004/0187740 A1 | 9/2004 | Timmons |
| 2004/0188091 A1 | 9/2004 | Luke et al. |
| 2004/0191439 A1 | 9/2004 | Bour et al. |
| 2004/0211562 A1 | 10/2004 | Brothers et al. |
| 2004/0211564 A1 | 10/2004 | Brothers et al. |
| 2004/0244650 A1 | 12/2004 | Brothers |
| 2004/0244977 A1 | 12/2004 | Luke et al. |
| 2004/0256102 A1 | 12/2004 | Trato |
| 2004/0261990 A1 | 12/2004 | Bosma et al. |
| 2004/0261999 A1 | 12/2004 | Nguyen |
| 2005/0000734 A1 | 1/2005 | Getzlaf et al. |
| 2005/0022991 A1 | 2/2005 | Rao |
| 2005/0034867 A1 | 2/2005 | Griffith et al. |
| 2005/0056191 A1 | 3/2005 | Brothers et al. |
| 2005/0061206 A1 | 3/2005 | Reddy et al. |
| 2005/0072599 A1 | 4/2005 | Luke et al. |
| 2005/0084334 A1 | 4/2005 | Shi et al. |
| 2005/0096207 A1 | 5/2005 | Urbanek |
| 2005/0098317 A1 | 5/2005 | Reddy et al. |
| 2005/0113260 A1 | 5/2005 | Wood |
| 2005/0113262 A1 | 5/2005 | Ravi et al. |
| 2005/0133221 A1 | 6/2005 | Chatterji et al. |
| 2005/0172864 A1 | 8/2005 | Dingosoyr et al. |
| 2005/0173117 A1 | 8/2005 | Roddy |
| 2005/0199401 A1 | 9/2005 | Patel et al. |
| 2006/0016598 A1 | 1/2006 | Urbanek |
| 2006/0025312 A1 | 2/2006 | Santra et al. |
| 2006/0054319 A1 | 3/2006 | Fyten et al. |
| 2006/0086503 A1 | 4/2006 | Reddy et al. |
| 2006/0089851 A1 | 4/2006 | Silby et al. |
| 2006/0122071 A1 | 6/2006 | Reddy et al. |
| 2006/0162926 A1 | 7/2006 | Roddy |
| 2006/0166834 A1 | 7/2006 | Roddy |
| 2006/0177661 A1 | 8/2006 | Smith et al. |
| 2006/0260512 A1 | 11/2006 | Nordmeyer |
| 2006/0260513 A1 | 11/2006 | Guiterrez et al. |
| 2006/0278131 A1 | 12/2006 | Hunt |
| 2007/0012436 A1 | 1/2007 | Freyer |
| 2007/0015668 A1 | 1/2007 | Harrower et al. |
| 2007/0017676 A1 | 1/2007 | Reddy et al. |
| 2007/0056475 A1 | 3/2007 | Roddy et al. |
| 2007/0056479 A1 | 3/2007 | Gray |
| 2007/0056732 A1* | 3/2007 | Roddy et al. ............. 166/292 |
| 2007/0056733 A1 | 3/2007 | Roddy et al. |
| 2007/0062691 A1 | 3/2007 | Reddy et al. |
| 2007/0102157 A1 | 5/2007 | Roddy et al. |
| 2007/0125534 A1 | 6/2007 | Reddy et al. |
| 2007/0137528 A1 | 6/2007 | LeRoy-Deluge et al. |
| 2007/0151484 A1 | 7/2007 | Reddy et al. |
| 2007/0151724 A1 | 7/2007 | Ohmer et al. |
| 2007/0151730 A1 | 7/2007 | Reddy et al. |
| 2007/0186820 A1 | 8/2007 | O'Hearn |
| 2007/0204765 A1 | 9/2007 | LeRoy-Deluge et al. |
| 2007/0227734 A1 | 10/2007 | Freyer |
| 2007/0246225 A1 | 10/2007 | Hailey, Jr. et al. |
| 2007/0255457 A1 | 11/2007 | Whitcomb et al. |
| 2007/0266903 A1 | 11/2007 | Gartner et al. |
| 2008/0017376 A1 | 1/2008 | Badalamenti et al. |
| 2008/0058229 A1 | 3/2008 | Berkland et al. |
| 2008/0099203 A1 | 5/2008 | Mueller et al. |
| 2008/0108524 A1 | 5/2008 | Willberg et al. |
| 2008/0135250 A1 | 6/2008 | Bosma et al. |
| 2008/0156491 A1 | 7/2008 | Roddy et al. |
| 2008/0261027 A1 | 10/2008 | Li et al. |
| 2008/0261834 A1 | 10/2008 | Simon |
| 2008/0277116 A1 | 11/2008 | Roddy et al. |
| 2009/0088348 A1 | 4/2009 | Roddy |
| 2009/0114126 A1 | 5/2009 | Roddy |
| 2009/0120644 A1 | 5/2009 | Roddy |
| 2009/0124522 A1 | 5/2009 | Roddy |
| 2009/0139719 A1 | 6/2009 | Luo |
| 2009/0200029 A1 | 8/2009 | Roddy et al. |
| 2009/0236097 A1* | 9/2009 | Roddy et al. .............. 166/293 |
| 2009/0260544 A1 | 10/2009 | Roddy |
| 2010/0016183 A1 | 1/2010 | Roddy et al. |
| 2010/0025039 A1 | 2/2010 | Roddy et al. |
| 2010/0075874 A1 | 3/2010 | Mercado et al. |
| 2010/0096135 A1 | 4/2010 | Roddy et al. |
| 2010/0193982 A1 | 8/2010 | Genolet et al. |
| 2010/0243236 A1 | 9/2010 | Koons |
| 2011/0162845 A1 | 7/2011 | Ravi et al. |
| 2011/0237467 A1 | 9/2011 | Cornette et al. |
| 2011/0312857 A1 | 12/2011 | Amanullah et al. |
| 2012/0015852 A1 | 1/2012 | Quintero et al. |
| 2013/0312641 A1 | 11/2013 | Chatterji et al. |

FOREIGN PATENT DOCUMENTS

| | | | |
|---|---|---|---|
| EP | 0748782 A1 | 12/1996 | |
| EP | 0814067 A1 | 12/1997 | ............ C04B 28/06 |
| EP | 1236701 A1 | 9/2002 | ............ C04B 28/04 |
| EP | 1394137 A2 | 7/2003 | ............ C04B 38/08 |
| EP | 1348831 A1 | 10/2003 | ............ E21B 33/13 |
| EP | 1686234 A1 | 8/2006 | |
| EP | 1719741 A1 | 11/2006 | |
| EP | 2465910 A1 | 11/2009 | |
| FR | 2787105 | 6/2000 | |
| GB | 1469954 | 4/1997 | ............ C04B 24/36 |
| GB | 2429725 A | 3/2007 | |
| JP | 52117316 A | 10/1977 | ............ C04B 13/02 |
| JP | 10110487 A | 4/1998 | ............ E04B 1/78 |
| SU | 1373781 A1 | 2/1988 | ............ E04G 21/12 |
| WO | WO 83/01443 A1 | 4/1983 | ............ C04B 7/14 |
| WO | 9011977 | 10/1990 | |
| WO | WO 97/05079 A1 | 2/1997 | |
| WO | WO 97/49644 A1 | 12/1997 | |
| WO | WO 98/54108 A1 | 12/1998 | ............ C04B 28/02 |
| WO | WO 00/63134 A1 | 1/2000 | ............ C04B 28/02 |
| WO | WO 00/49272 A1 | 8/2000 | |
| WO | WO 00/50357 A1 | 8/2000 | |
| WO | WO 01/87796 A1 | 11/2001 | |
| WO | WO 03/008756 A1 | 1/2003 | |
| WO | WO 03/031364 A1 | 4/2003 | ............ C04B 18/06 |
| WO | WO 2004/001188 A1 | 12/2003 | |
| WO | WO 2004/057715 A2 | 7/2004 | |
| WO | WO 2004/101951 A1 | 11/2004 | |
| WO | WO 2004/101952 A1 | 11/2004 | |
| WO | WO 2005/047212 A1 | 5/2005 | ............ C04B 38/10 |
| WO | WO 2005/061846 A1 | 7/2005 | ............ E21B 33/13 |
| WO | WO 2005/080287 A1 | 8/2005 | |
| WO | WO 2006/053896 A1 | 11/2005 | |
| WO | WO 2006/032841 A1 | 3/2006 | |
| WO | WO 2008/034461 A1 | 3/2008 | |
| WO | WO 2009/030758 A1 | 3/2009 | |

OTHER PUBLICATIONS

Poon, "A Study of the Hydration of Natural Zeolite Blended Cement Pastes", 1999.
"Beneficial use of Solid Waste in Maine", Apr. 14, 2005.
Smith, "Cementing" Society of Petroleum Engineers, p. 38, 1990.
Smith, "Cementing" Society of Professional Engineers, pp. 14, 38, 1987.

(56) References Cited

OTHER PUBLICATIONS

Chan, Comparative Study of the Initial Surface Absorption and Chloride Diffusion of High Performance Zeolite Silica Fume and PFA concretes, 1999.
Rogers, "Designing a Remedial Acid Treatment for Gulf of Mexico Deepwater Turbidite Sands Containing Zeolite Cement", 1996.
Janotka, "Effect of Bentonite and Zeolite on Durability of Cement Suspension Under Sulfate Attack", 1998.
Ding, "Extreme Vertices Design of Concrete With Combined Mineral Admixtures", 1999.
"Kiln Dusts", Apr. 14, 2005.
Sersale, "Portland-Zeolite-Cement for Minimizing Alkali-Aggregate Expansion", 1987.
"Standards for the Management of Cement Kiln Dust Waste", Apr. 14, 2005.
Naigian, "Study on the Suppression Effect of Natural Zeolite on Expansion of Concrete Due to Alkali-Aggregate Reaction", 1998.
Janotka, "The Properties of Mortar Using Blends With Portland Cement Clinker, Zeolite Tuff and Gypsum", 1995.
Herndon, "Setting Downhole Plugs: A State-of-the-Art, Petroleum Engineer International", Apr. 1978.
Sugama, "Hot Alkali Carbonation of Sodium Metaphosphate Modified Fly Ash/Calcium Aluminate Blend Hydrothermal Cements", pp. 1661-1672, Sep. 11, 1996.
"Use of Cement Kiln Dust for the Stabilization of Soils", R. L. Parsons, et al, Apr. 14, 2005.
Feng, "Zeolite Ceramiste Cellular Concrete", 2000.
Marfil, "Zeolite Crystallization in Portland Cement Concrete Due to Alkali-Aggregate Reaction", 1993.
Atkins, "Zeolite P in Cements", "Its Potential for Immobilizing Toxic and Radioactive Waste Species", 1995.
HES Brochure "AQF-2 Foaming Agent", 1999.
HES Brochure "Halad-23 Fluid Loss Additive", 2000.
HES Brochure "Halad-344 Fluid Loss Additive", 1998.
HES Brochure "Halad-413 Fluid Loss Additive", 1999.
HES Brochure "Howco Suds Surfactant", 1999.
HES Brochure "HR-12 Cement Retarder", 1999.
HES Brochure "HR-15 Cement Retarder", 1999.
HES Brochure "HR-25 Cement Retarder" dated 1999.
HES Brochure "HR-4 Cement Retarder", 1999.
HES Brochure HR-5 Cement Additive, 1998.
HES Brochure "HR-7 Cement Retarder", 1999.
HES Brochure "Pozmix A Cement Additive", 1999.
HES Brochure "SCR-100 Cement Retarder a Valuable Time Saver", 1994.
HES Brochure "SCR-100 Cement Retarder", 1999.
HES Brochure "SCR-500L High Temp Retarder", 2000.
HES Brochure "ThermaLock™ Cement for Corrosive $CO_2$ Environments", 1999.
"3M Scotchlite, Glass Bubbles Floated Product Series Product Information", 1999.
"API Specification for Materials and Testing for Well Cements", API Spec. 10, 5th ed., pp. 7, 19-21, Jul. 1, 1980.
"Appendix A", API RP 13B-2, 2d ed.; pp. 6-8, Dec. 1, 1991.
LAFARGE brochure "TerraCem™", Aug. 2006.
LAFARGE MSDS "Cement Kiln Dust", Mar. 3, 2005.
LAFARGE MSDS "LaFarge Blended Cement (cement)", Mar. 3, 2005.
TXI Material Safety Data Sheet for Pressur-Seal, Oct. 2003.
"Manufacture of supplementary cementitious materials from cement kiln dust", Mishulovich et al., World Cement Research and Development, p. 116-120, Mar. 1996.
"Alkali-activated binders by use of industrial by-products", Buchwald et al., Cement and concrete Research 35, p. 968-793, 2005.
Answer 3 of 24 Chemical Abstracts on STN "Effect of cement kiln dust substitution on chemical and physical properties and compressive strength of Portland and slag cements", Adb El-aleem et al. (abstract only), 2005.
Office Action from U.S. Appl. No. 11/223,671, Dec. 15, 2005.
Office Action from U.S. Appl. No. 11/271,431, Mar. 6, 2006.
Office Action from U.S. Appl. No. 11/223,671, Mar. 31, 2006.
Office Action from U.S. Appl. No. 11/271,431, May 17, 2006.
Office Action from U.S. Appl. No. 11/271,431 (Advisory Action), Jul. 11, 2006.
Office Action from U.S. Appl. No. 11/416,563, Jul. 21, 2006.
Office Action from U.S. Appl. No. 11/403,032, Jul. 24, 2006.
Office Action from U.S. Appl. No. 11/271,431, Aug. 15, 2006.
Office Action from U.S. Appl. No. 11/440,627, Aug. 21, 2006.
Office Action from U.S. Appl. No. 11/402,741, Oct. 19, 2006.
Office Action from U.S. Appl. No. 11/484,951, Oct. 26, 2006.
Office Action from U.S. Appl. No. 11/484,951, Dec. 21, 2006.
Office Action from U.S. Appl. No. 11/223,703, Jan. 17, 2007.
Office Action from U.S. Appl. No. 11/402,741, Feb. 2, 2007.
Office Action from U.S. Appl. No. 11/223,485, Feb. 28, 2007.
Office Action from U.S. Appl. No. 11/223,669, Feb. 28, 2007.
Office Action from U.S. Appl. No. 11/271,690, Mar. 13, 2007.
Office Action from U.S. Appl. No. 11/402,741, Mar. 22, 2007.
Office Action from U.S. Appl. No. 11/223,703, Apr. 25, 2007.
Office Action from U.S. Appl. No. 11/402,741, May 29, 2007.
Office Action from U.S. Appl. No. 11/223,669, Jun. 18, 2007.
Office Action from U.S. Appl. No. 11/416,754 (Notice of Allowance), Jul. 2, 2007.
Office Action from U.S. Appl. No. 11/223,485 (Notice of Allowance), Aug. 3, 2007.
Office Action from U.S. Appl. No. 11/257,261, Aug. 10, 2007.
Office Action from U.S. Appl. No. 11/271,690 (Notice of Allowance), Aug. 13, 2007.
Office Action from U.S. Appl. No. 11/402,741, Sep. 6, 2007.
Office Action from U.S. Appl. No. 11/223,669, Oct. 9, 2007.
Office Action from U.S. Appl. No. 11/223,750, Oct. 16, 2007.
Office Action from U.S. Appl. No. 11/416,754 (Notice of Allowance), Oct. 17, 2007.
Office Action from U.S. Appl. No. 11/257,261 (Notice of Allowance), Oct. 23, 2007.
Office Action from U.S. Appl. No. 11/402,741, Oct. 24, 2007.
Office Action from U.S. Appl. No. 11/223,750 (Notice of Allowance), Dec. 11, 2007.
Office Action from U.S. Appl. No. 11/402,741 (Notice of Allowance), Dec. 13, 2007.
Office Action from U.S. Appl. No. 11/223,669, Jan. 29, 2008.
Office Action from U.S. Appl. No. 11/256,824 (Notice of Allowance), Feb. 27, 2008.
Office Action from U.S. Appl. No. 11/223,703 (Notice of Allowance), Feb. 27, 2008.
Office Action from U.S. Appl. No. 11/223,669, Apr. 8, 2008.
Office Action from U.S. Appl. No. 11/223,669 (Notice of Allowance), Jun. 30, 2008.
Office Action from U.S. Appl. No. 12/034,886 (Notice of Allowance), Oct. 21, 2008.
Harris et al., "Successful Remedial Operations Using Ultrafine Cement", SPE 24294, 1992.
Heathman et al., "Case Histories Regarding the Application of Microfine Cements", Cementing Technical Paper SPE 23926, 1992.
Halliburton brochure entitled "Micro Matrix Cement", Nov. 2006.
Dalrymple et al., "A Selective Water Control Process", SPE 24330, 1992.
Halim et al., "Preparation of an ultra fast binding cement from calcium silicate-based mixed oxide nanoparticles", Nanotechnology 18, 2007.
Nanocor brochure entitled "Nanoclay Structure", Jun. 24, 2008.
He et al., "Chloride Permeability and Microstructure of Portland Cement Mortars Incorporating Nanomaterials", Abstract, Transportation Research Board Annual Meeting 2007 Paper #08-1041, 2008.
Chang et al., "Material Properties of Portland Cement Paste with Nano-Montmorillonite," J. Material Science, May 18, 2007.
Office Action from U.S. Appl. No. 10/775,348, Nov. 23, 2005.
Office Action from U.S. Appl. No. 10/775,348, May 2, 2006.
Notice of Allowance from U.S. Appl. No. 10/775,348, Jun. 6, 2006.
Notice of Allowance from U.S. Appl. No. 11/388,644, Jan. 3, 2008.
Office Action from U.S. Appl. No. 12/008,923, May 20, 2008.
Notice of Allowance from U.S. Appl. No. 12/008,923, Jul. 22, 2008.
Office Action from U.S. Appl. No. 11/388,645, Apr. 3, 2009.
Office Action from U.S. Appl. No. 11/388,645, Jul. 30, 2009.

(56) References Cited

OTHER PUBLICATIONS

Nanocor Technical brochure entitled "Nanoclay Structures", Mar. 18, 2009.
Halliburton brochure entitled, "Cementing WellLife III Cementing Service", Apr. 2008.
Darbe, "Slurry Design Considerations for Mechanically Enhanced Cement Systems", AADE-08-DF-HO-06, 2008.
Halamickova, "Water Permeability and Chloride Ion Diffusion in Portland Cement Mortars: Relationship to Sand Content and Critical Pore Diameter", Cement and Concrete Research, vol. 25, No. 4, pp. 790-802, 1995.
Ravi, "Interventionless Zonal Isolation", Cementing, May 2008.
Schlumberger brochure, "Futur Active set-cement technology for long-term zonal isolation", 2007.
Halliburton brochure, "WellLife III Cementing Service for CO2 Environments", Jun. 2009.
Hunter, "Three Key Mechanisms Deliver Zonal Isolation", IADC.
Office Action from U.S. Appl. No. 11/747,002, Apr. 2, 2008.
Office Action from U.S. Appl. No. 11/747,002, May 27, 2008.
Office Action from U.S. Appl. No. 11/747,002, Jul. 10, 2008.
Office Action from U.S. Appl. No. 11/747,002, Mar. 3, 2009.
PCT International Searching Authority for International Application No. PCT/GB2009/002596, Feb. 8, 2010.
Office Action from U.S. Appl. No. 12/426,645, May 5, 2010.
Office Action from U.S. Appl. No. 12/472,561, May 5, 2010.
PCT International Search Report and Written Opinion for International Application No. PCT/GB2010/000485, May 21, 2010.
"Effect of Nano-SiO2 on heat of hydration of portland cement," Xu et al., Nanjing Gongye Daxue Xuebao, Ziran Kexeuban, 29(4), 45-48, abstract only, 2007.
"Application of nanometer silica in inorganic nonmetallic materials," Deng et al., Taoci (Xiangyang China), (9), 8-12, abstract only, 2007.
"Reaction mechanism analyses of cement based composite materials modified by nano-silica," Xu et al., Kuangye Gongcheng (Changsha, China), 27(3), 99-102, abstract only, 2007.
"Research on Reinforcement of cement composites and relevant mechanism," Yu et al., Qiangdoa Keji Daxue Xuebao, Ziran Kexueban, 27(2), 148-151, abstract only, 2006.
"Antagonistic Effect of superplasticizer and colloidal nanosilica in the hydration of Alite and Belite pastes," Bjoernstrom et al., Journal of Materials Science, 42(11), 3901-3907, abstract only, 2007.
"Nano-concrete: possibilities and challenges," Balaguru et al., RILEM Proceedings (2005), PRO 45 (2nd Int'l Symposium on Nanotechnology in construction (NICOM2), 233-243, abstract only, 2005.
"A comparative study on the pozzolanic activity between nano-SiO2 and silica fume," Ye et al., Journal of Wuhan Univ of Technology, Mat'ls Science Edition, 21(3), 153-157, abstract only, 2006.
"Optimization of silica fume, fly ash and amorphous nano-silica in superplasticized high-performance concrete," Collepardi et al., American Concrete Institute, SP 2004, SP-221 (Eight CANMET/ACI International Conference on Fly Ash, Silica Fume, Slag, and Natrural Pozzolans in Concrete), 495-505, abstract only, 2004.
"Accelerating effects of colloidal nano-silica for beneficial calcium-silicate-hydrate formation in cement," Bjornstrom et al., Chemical Physics Letters, 392 (1-3), 242-248, abstract only, 2004.
"Experimental study on cement-based composites with nano-SiO2," Feng et al., Cailiao Kexue Yu Gongcheng Zuebao Bianjibu, 22(2), 224-227, 2004.
"Strong and bioactive composites containing nano-silica-fused whiskers for bone repair," Xu et al., Biomaterials, 25(19), 4615-4626, abstract only, 2004.
Research on properties of Portland cement added with nano-SiO2, Wang et al., RILEM Proceedings (2003), PRO 32 (International Conference on Advances in Concrete and Structures, vol. 1), 154-161, abstract only, 2003.
"Comparison on properties of high strength concrete with nano-SiO2 and silica fume added," Ye et al., Jianzhu Cailiao Xuebao, 6(4), 381-385, abstract only, 2003.
"Study on compound effect of silica fume and nano-SiOx for cementing composite materials," Tang et al., Guisuanyan Xuebao, 3(5), 523-527, abstract only, 2003.
"Effect of nano-SiOx and silica fume on cement paste water demand," Li et al., Shenyang Jianzhu gongcheng Xueyuan Xuebao, Ziran Kexueban, 18(4), 278-281, abstract only, 2002.
"Hydration reaction between C3S and fly ash, silica fume, nano-SiO2, and microstructure of hydrated pastes," Ba et al., Guisuanyan Xuebao, 30(6), 780-784, abstract only, 2002.
"Nano-silica—an additive for high-strength concrete," Wagner et al., Wissenschaftliche Zeitschrift—Hoschule fuer Architektur und Bauwesen Weimar—Universitaet, 40 (5/6/7), 183-87, abstract only, 1994.
"Investigations on the preparation and mechanical properties of the nano-alumina reinforced cement composite," Li et al., Materials Letters, 0(3), 356-359, abstract only, 2006.
"Effect of secondary interface microstructure on pore structure and performance of cement-based materials," Feng et al., Cailiao Yanjiu Xuebao, 17(5), 489-494, abstract only, 2003.
"Preparation of multifunctional dry-power paints," Yanmin Gao, Faming Zhuanli Shenqing gongkai Shuomingshu, 4 pages, abstract only, 2005.
Office Action from U.S. Appl. No. 12/426,393, Jul. 2, 2010.
Notice of Allowance from U.S. Appl. No. 12/472,561, Jun. 29, 2010.
PCT International Search Report and Written Opinion for International Application No. PCT/GB2010/001045, Jul. 21, 2010.
Office Action from U.S. Appl. No. 11/388,645, Aug. 17, 2010.
Office Action from U.S. Appl. No. 12/833,189, Oct. 1, 2010.
Office Action from U.S. Appl. No. 12/833,189, Nov. 10, 2010.
Notice of Allowance from U.S. Appl. No. 12/426,393, Dec. 16, 2010.
PCT International Search Report and Written Opinion for International Application No. PCT/GB2010/001806, Jan. 20, 2011.
English language abstract of CN 101544488, Sep. 30, 2009.
Office Action from U.S. Appl. No. 12/833,189, Feb. 17, 2011.
Howard, "An Analysis and the Control of Lost Circulation", Petroleum Transactions, AIME, vol. 192, pp. 171-182, 1951.
Darley, "Composition and Properties of Drilling and Completion Fluids", Fifth Edition, Gulf Publishing Company, pp. 446-454; 595-598, 1988.
HES Brochure "Latex 2000", Aug. 2006.
Campillo et al., "Improvement of initial mechanical strength by nanoalumina in belite cements", Science Direct, Materials Letters 61, pp. 1889-1892, 2007.
PCT International Search Report and Written Opinion for International Application No. PCT/GB2011/000003, Apr. 18, 2011.
"Effect of the particle size on the micro and nanostructural features of calcium phosphate cement: a kinetic analysis", Biomaterials 25, 3453-3462, 2004.
Office Action from U.S. Appl. No. 12/567,782, Apr. 5, 2011.
Office Action from U.S. Appl. No. 12/651,662, Apr. 5, 2011.
Office Action from U.S. Appl. No. 12/567,783, Apr. 6, 2011.
Office Action from U.S. Appl. No. 12/263,954, Apr. 20, 2011.
Office Action from U.S. Appl. No. 12/651,662, Apr. 22, 2011.
Office Action from U.S. Appl. No. 12/567,782, Apr. 25, 2011.
Office Action from U.S. Appl. No. 12/833,189, May 16, 2011.
Office Action from U.S. Appl. No. 12/833,189, Jul. 18, 2011.
Office Action from U.S. Appl. No. 12/263,954, Aug. 8, 2011.
Office Action from U.S. Appl. No. 12/567,783, Aug. 23, 2011.
Office Action from U.S. Appl. No. 12/833,189, Oct. 11, 2011.
Office Action from U.S. Appl. No. 12/651,662, Nov. 28, 2011.
Office Action from U.S. Appl. No. 12/833,189, Feb. 7, 2012.
Office Action from U.S. Appl. No. 12/567,782, Mar. 2, 2012.
Office Action from U.S. Appl. No. 13/052,471, Mar. 6, 2012.
Office Action from U.S. Appl. No. 12/651,662, Mar. 14, 2012.
USPTO Office Action for U.S. Appl. No. 12/567,782 dated Jul. 25, 2012.
USPTO Office Action for U.S. Appl. No. 12/651,662 dated Aug. 2, 2012.
USPTO Office Action for U.S. Appl. No. 13/052,471 dated Jun. 28, 2012.
Written Opinion of the International Searching Authority for PCT/GB/2010/000485 dated Oct. 25, 2011.

(56) References Cited

OTHER PUBLICATIONS

Written Opinion of the International Searching Authority for PCT/GB/2011/000003 dated Jul. 12, 2012.
Communication from EPO for EPO App. No. 12159772.8 dated May 3, 2012.
Li et al., "Investigations on the preparation and mechanical properties of the nano-alumina reinforced cement composite", Science Direct, Materials Letters 60, pp. 356-359, 2006.
International Search Report for PCT/GB2010/001805 dated Mar. 31, 2011.
Written Opinion for PCT/GB2010/001805 dated Mar. 27, 2012.
USPTO Office Action for U.S. Appl. No. 13/431,701 dated Nov. 9, 2012.
Office Action from U.S. Appl. No. 12/567,782 dated Feb. 8, 2013.
Office Action from U.S. Appl. No. 13/435,701 dated Feb. 19, 2013.
Office Action from U.S. Appl. No. 12/651,662 dated Feb. 13, 2013.
Office Action from U.S. Appl. No. 12/833,189 dated Feb. 6, 2013.
Office Action from U.S. Appl. No. 13/443,934 dated Mar. 4, 2013.
International Search Report and Written Opinion for PCT/GB2010/0010445 dated Jul. 21, 2010.
Office Action from U.S. Appl. No. 13/052,471 dated Feb. 4, 2013.
Communication from EPO from Application No. 12159772.8 dated Feb. 14, 2013.
International Preliminary Report on Patentability from PCT/GB2009/002596, dated May 3, 2011.
Office Action for U.S. Appl. No. 12/833,189 dated May 28, 2013.
Office Action for U.S. Appl. No. 13/435,701 dated Jun. 4, 2013.
Office Action for U.S. Appl. No. 12/567,782 dated Jun. 21, 2013.
Office Action for U.S. Appl. No. 13/443,934 dated Jun. 27, 2012.
Office Action for U.S. Appl. No. 13/052,471 dated May 10, 2013.
Office Action for U.S. Appl. No. 13/431,701, dated Jul. 11, 2013.
Office Action for U.S. Appl. No. 12/263,954 dated Mar. 14, 2013.
Search Report and Written Opinion for PCT/US2013/038343 dated Jul. 31, 2013.
Andrew R. Barron, Chemical composition of Portland Cement, viewed on Aug. 26, 2013, last edited by author on Jan. 4, 2010.
International Preliminary Report and Written Opinion of PCT/GB2010/001806 dated Mar. 27, 2012.
Office Action for U.S. Appl. No. 12/263,954 dated Oct. 8, 2013.
Office Action for U.S. Appl. No. 12/567,783 dated Oct. 3, 2013.
Office Action for U.S. Appl. No. 13/435,701 dated Oct. 4, 2013.
EPO Office Action for Application No. 09751959.9 dated Sep. 27, 2013.
USPTO Office Action for U.S. Appl. No. 13/458,112 dated Dec. 26, 2013.
USPTO Notice of Allowance for U.S. Appl. No. 13/052,471 dated Jan. 30, 0214.
HES Brochure, "FlexPlug Services" dated Apr. 2008.
HES Brochure, "Thermatek Services" dated May 2005.
HES Brochure, "Fuse-It Circulation Treatment" dated May 2006.
USPTO Office Action for U.S. Appl. No. 13/458,112 dated Apr. 1, 2014.
USPTO Final Office Action for U.S. Appl. No. 13/435,701 dated Feb. 20, 2014.
USPTO Office Action for U.S. Appl. No. 13/620,013 dated Jan. 30, 2014.
USPTO Final Office Action for U.S. Appl. No. 12/263,954 dated May 9, 2014.
USPTO Final Office Action for U.S. Appl. No. 12/567,783 dated May 9, 2014.
Australian Examination Report GCC/P/2009/14628 dated Nov. 21, 2013.
International Report on Patentability for International Application No. PCT/US2013/038343 dated Oct. 28, 2014.
International Preliminary Report on Patentability for PCT/US13/038343 dated Nov. 6, 2014.

* cited by examiner

WELL TREATMENT COMPOSITIONS AND METHODS UTILIZING NANO-PARTICLES

CROSS-REFERENCE TO RELATED APPLICATIONS

The present application is a continuation-in-part of U.S. patent application Ser. No. 12/567,782, filed Sep. 27, 2009, entitled "Cement Compositions and Methods Utilizing Nano-Clay," which is a continuation-in-part of U.S. patent application Ser. No. 12/263,954, filed Nov. 3, 2008, entitled "Cement Compositions and Methods Utilizing Nano-Hydraulic Cement," which is a continuation-in-part of U.S. patent application Ser. No. 11/747,002, now U.S. Pat. No. 7,559,369, filed on May 10, 2007, entitled "Well Treatment Compositions and Methods Utilizing Nano-Particles." The entire disclosures of these applications are incorporated herein by reference.

BACKGROUND

The present invention relates to well treatment compositions and methods utilizing nano-particles and, more particularly, in one or more embodiments, to well cement compositions and/or well completion fluids that comprise nano-particles.

In general, well treatments include a wide variety of methods that may be performed in oil, gas, geothermal and/or water wells, such as drilling, completion and workover methods. The drilling, completion and workover methods may include, but are not limited to, drilling, fracturing, acidizing, logging, cementing, gravel packing, perforating and conformance methods. Many of these well treatments are designed to enhance and/or facilitate the recovery of desirable fluids from a subterranean well.

In cementing methods, such as well construction and remedial cementing, well cement compositions are commonly utilized. For example, in subterranean well construction, a pipe string (e.g., casing and liners) may be run into a well bore and cemented in place using a cement composition. The process of cementing the pipe string in place is commonly referred to as "primary cementing." In a typical primary cementing method, a cement composition may be pumped into an annulus between the walls of the well bore and the exterior surface of the pipe string disposed therein. The cement composition sets in the annular space, thereby forming an annular sheath of hardened, substantially impermeable cement that supports and positions the pipe string in the well bore and bonds the exterior surface of the pipe string to the subterranean formation. Among other things, the annular sheath of set cement surrounding the pipe string functions to prevent the migration of fluids in the annulus, as well as protecting the pipe string from corrosion. Cement compositions also may be used in remedial cementing methods, such as squeeze cementing and the placement of cement plugs.

In operation, the annular sheath of cement formed between the well bore and the pipe string often suffers structural failure due to pipe movements which cause shear stresses to be exerted on the set cement. Such stress conditions are commonly the result of relatively high fluid pressures and/or temperatures inside the cemented pipe string during testing, perforating, fluid injection or fluid production. For example, such stress may occur in wells subjected to steam recovery or production of hot formation fluids from high-temperature formations. The high-internal pipe pressure and/or temperature can result in the expansion of the pipe string, both radially and longitudinally, which places stresses on the cement sheath causing the cement bond between the exterior surfaces of the pipe or the well bore walls, or both, to fail and thus allow leakage of formation fluids and so forth. Accordingly, it may be desirable for the cement composition utilized for cementing pipe strings in the well bores to develop high strength after setting and to have sufficient resiliency (e.g., elasticity and ductility) to resist loss of the cement bond between the exterior surfaces of the pipe or the well bore walls, or both. Also, it may be desirable for the cement composition to be able to resist cracking and/or shattering that may result from other forces on the cement sheath. For example, it may be desirable for the cement sheath to include structural characteristics that protect its structural integrity from forces associated with formation shifting, overburden pressure, subsidence, tectonic creep, pipe movements, impacts and shocks subsequently generated by drilling and other well operations.

In addition to including components that improve mechanical properties of the cement, in a number of cementing methods, it may also be desirable to include one or more set accelerators in the well cement compositions to counteract certain constituents and/or environmental characteristics that excessively slow set times. For example, among other things, low temperatures and cement additives (e.g., fluid loss control additives and dispersants) can cause or contribute to an excessive set time for a cement composition. Accordingly, in certain situations, it may be desirable to reduce the set time by including a set accelerator in the cement composition. That is, the set accelerator may be included in a cement composition to counteract components of the cement composition or conditions surrounding the cement composition that are causing an excessive set time.

Completion fluids are another type of fluid that may be used in well treatments. A completion fluid is typically a solids-free liquid that is used, in part, to control well pressure while completing the well. The completion fluid is typically placed into the well bore after drilling, but before the start of production, to facilitate completion of the well, which typically involves preparing the bottom of the well bore to the required specifications, running in the production tubing and its associated downhole equipment, and optionally carrying out production enhancement operations, if desired. The completion fluid should generally be chemically compatible with the reservoir formation and fluid and should not damage the permeability of the formation or other equipment placed into the well bore, such as production screens. To avoid such damage, the completion fluid is typically filtered to a high degree to remove any solids that could be introduced into the near-well bore region or downhole equipment.

Brines, such as chlorides, bromides, and formates, have typically been used as completion fluids. However, these metal brines can be expensive, corrosive, and difficult to handle. For example, brines may tend to corrode and damage the downhole equipment in many instances, especially those of a delicate nature such as production screens. Brines may also cause undesired precipitation reactions that can damage the permeability of the producing formation. Furthermore, disposal of the brines may be difficult and costly, especially on land where environmental regulations prohibit the placement of high concentrations of chlorides and other ions into landfills.

SUMMARY

The present invention relates to well treatment compositions and methods utilizing nano-particles and, more particularly, in one or more embodiments, to well cement compositions and/or well completion fluids that comprise nano-particles.

An embodiment of the present invention provides a method of completing a well comprising: including nano-particles in a completion fluid; and using the completion fluid in completing the well.

Another embodiment of the present invention provides a method of completing a well comprising: providing a completion fluid comprising nano-particles; and introducing the completion fluid into a well bore.

Another embodiment of the present invention provides a method of completing a well comprising: including nano-particles having a particle size of from about 1 nanometer to about 100 nanometers in a completion fluid, wherein the nano-particles comprise at least one nano-particle selected from the group consisting of nano-alumina, nano-zinc oxide, nano-boron, nano-iron oxide, nano-silica, and any combination thereof; and using the completion fluid in completing the well.

The features and advantages of the present invention will be apparent to those skilled in the art upon reading the following description of specific embodiments.

DESCRIPTION OF SPECIFIC EMBODIMENTS

The present invention relates to well treatment compositions and methods utilizing nano-particles and, more particularly, in one or more embodiments, to well cement compositions and/or well completion fluids that comprise nano-particles.

Cement Composition Embodiments

An exemplary embodiment of the cement compositions of the present invention comprises cement, water and particulate nano-silica. Those of ordinary skill in the art will appreciate that the exemplary cement compositions generally should have a density suitable for a particular application. By way of example, the cement composition may have a density in the range of from about 4 pounds per gallon ("lb/gal") to about 20 lb/gal. In exemplary embodiments, the cement compositions may have a density in the range of from about 8 lb/gal to about 17 lb/gal. Exemplary embodiments of the cement compositions may be foamed or unfoamed or may comprise other means to reduce their densities, such as hollow microspheres, low-density elastic beads, or other density-reducing additives known in the art. Those of ordinary skill in the art, with the benefit of this disclosure, will recognize the appropriate density for a particular application.

Exemplary embodiments of the cement compositions of the present invention comprise a cement. Any of a variety of cements suitable for use in subterranean cementing operations may be used in accordance with exemplary embodiments of the present invention. Suitable examples include hydraulic cements that comprise calcium, aluminum, silicon, oxygen and/or sulfur, which set and harden by reaction with water. Such hydraulic cements, include, but are not limited to, Portland cements, pozzolana cements, gypsum cements, high-alumina-content cements, slag cements, silica cements and combinations thereof. In certain embodiments, the hydraulic cement may comprise a Portland cement. The Portland cements that may be suited for use in exemplary embodiments of the present invention are classified as Class A, C, H and G cements according to American Petroleum Institute, *API Specification for Materials and Testing for Well Cements*, API Specification 10, Fifth Ed., Jul. 1, 1990.

The water used in exemplary embodiments of the cement compositions of the present invention may be freshwater or saltwater (e.g., water containing one or more salts dissolved therein, seawater, brines, saturated saltwater, etc.). In general, the water may be present in an amount sufficient to form a pumpable slurry. In exemplary embodiments, the water may be present in the cement compositions in an amount in the range of from about 33% to about 200% by weight of the cement on a dry basis ("bwoc"). In exemplary embodiments, the water may be present in an amount in the range of from about 35% to about 70% bwoc.

In addition, exemplary embodiments of the cement compositions comprise nano-silica. The nano-silica may be described as particulate nano-silica. That is, the nano-silica may be particulate in nature and not, for example, a colloidal silica or a suspension of silica in solution. Indeed, in one embodiment, the particulate nano-silica may be added to the cement composition as a dry nano-silica powder. Generally, the particulate nano-silica may be defined as nano-silica having a particle size of less than or equal to about 100 nm. For example, the particulate nano-silica may have a particle size in the range of from about 1 nm to about 100 nm (about $1 \times 10^{-9}$ m to about $100 \times 10^{-9}$ m). In certain exemplary embodiments, the particulate nano-silica may have a particle size of less than or equal to about 50 nm. For example, the particulate nano-silica may have a particle size in the range of from about 5 nm to about 50 nm. In further exemplary embodiments, the particulate nano-silica may have a particle size of less than or equal to about 30 nm. For example, the particulate nano-silica may have a particle size in the range of from about 5 nm to about 30 nm. However, it should be noted that the particulate nano-silica may be utilized in combination with differently sized silica particles in accordance with present embodiments. For example, a number of silica particles with particle sizes greater than 100 nm may be included in a cement composition in accordance with present embodiments.

It is now recognized that the particulate nano-silica utilized with present embodiments, which may include silicon dioxide, may have an impact on certain physical characteristics of resulting cements. For example, relative to inclusion of colloidal silica or larger silica particles in a cement slurry, inclusion of particulate nano-silica in the cement slurry may provide improved mechanical properties, such as compressive strength, tensile strength, Young's modulus and Poisson's ratio. In addition, the particulate nano-silica also may be included in the cement composition as a set accelerator to accelerate the set time of the resultant cement composition. Accordingly, a cement composition in accordance with present embodiments may comprise a sufficient amount of particulate nano-silica to provide the desired characteristics in a resulting cement. In exemplary embodiments, the particulate nano-silica may be present in the cement composition in an amount in the range of from about 1% to about 25% bwoc. In exemplary embodiments, the particulate nano-silica may be present in the cement composition in an amount in the range of from about 5% to about 15% bwoc.

Other additives suitable for use in subterranean cementing operations also may be added to exemplary embodiments of the cement compositions. Examples of such additives include, strength-retrogression additives, set accelerators, weighting agents, weight-reducing additives, heavyweight additives, lost-circulation materials, filtration-control additives, dispersants, defoaming agents, foaming agents, and combinations thereof. Specific examples of these, and other, additives include crystalline silica, amorphous silica, salts, fibers, hydratable clays, vitrified shale, microspheres, fly ash, lime, latex, thixotropic additives, combinations thereof and the like. A person having ordinary skill in the art, with the benefit of this disclosure, will readily be able to determine the type and amount of additive useful for a particular application and desired result.

As will be appreciated by those of ordinary skill in the art, exemplary embodiments of the cement compositions of the present invention may be used in a variety of subterranean applications, including primary and remedial cementing. Exemplary embodiments of the cement compositions may be introduced into a subterranean formation and allowed to set therein. Exemplary embodiments of the cement compositions may comprise cement, water and the particulate nano-silica. By way of example, in exemplary primary cementing embodiments, a cement composition may be introduced into a space between a subterranean formation and a pipe string located in the subterranean formation. The cement composition may be allowed to set to form a hardened mass in the space between the subterranean formation and the pipe string. In addition, in exemplary remedial cementing embodiments, a cement composition may be used, for example, in squeeze-cementing operations or in the placement of cement plugs. One or more hydrocarbons (e.g., oil, gas, etc.) may be produced from a well bore penetrating the subterranean formation.

While the preceding discussion is directed to the use of particulate nano-silica, those of ordinary skill in the art will also appreciate that it may be desirable to utilize other types of nano-particles, in accordance with embodiments of the present invention. Examples of such nano-particles include nano-alumina, nano-zinc oxide, nano-boron, nano-iron oxide and combinations thereof. In certain exemplary embodiments, the nano-particles may be particulate in nature and not, for example, a colloidal nano-particle or a suspension of the nano-particle in solution. Furthermore, while the preceding discussion is directed to the use of particulate nano-silica in well cementing methods, those of ordinary skill in the art will appreciate that the present technique also encompasses the use of nano-particles in any of a variety of different subterranean treatments. For example, the nano-particles may be included in any of a number of well treatment fluids that may be used in subterranean treatments, including drilling fluids, completion fluids, stimulation fluids and well clean-up fluids. In accordance with another embodiment, the nano-particles may be included as proppant in a well treatment fluid. For example, a well treatment fluid containing the nano-particles may be introduced into a subterranean formation at or above a pressure sufficient to create or enhance one or more fractures in the subterranean formation. Enhancing a fracture includes enlarging a pre-existing fracture in the formation. At least a portion of the nano-particles may be deposited in the one or more fractures such that the fractures are prevented from fully closing upon the release of pressure, forming conductive channels through which fluids may flow to (or from) the well bore.

In addition to the use of the nano-particles without encapsulation, embodiments of the present invention may include encapsulation of the nano-particles to facilitate transportation and incorporation of the nano-particles in well treatment fluids (e.g., cement compositions). Specifically, encapsulation of the nano-particles in accordance with present embodiments may include enclosing the nano-particles within an outer coating or container in particulate form. Exemplary methods of encapsulation are set forth in U.S. Pat. Nos. 5,373,901; 6,444,316; 6,527,051; 6,554,071; 7,156,174; and 7,204,312, the relevant disclosures of which are incorporated herein by reference.

Various types of encapsulation may be employed such that the nano-particles (e.g., the particulate nano-silica) are contained but retains its particulate nature and, thus, retains its corresponding impact on physical properties of cement slurries. For example, the nano-particles may be encapsulated within a bag, capsule, layer, coating or the like. Further, the material utilized to encapsulate the nano-particles may be selected to facilitate transportation and/or incorporation of the nano-particles into a well treatment fluid. For example, to facilitate handling of the nano-particles and/or to facilitate timed release of the nano-particles, the encapsulation material may be degradable. This may facilitate handling of the nano-particles by allowing inclusion of the encapsulated nano-particles in a well treatment fluid without requiring that the nano-particles first be removed from the encapsulating material. Further, the encapsulating material may be designed to degrade at a certain rate when in contact with certain materials (e.g., water) so that the nano-particles are released into the well treatment fluid at a desired time. Exemplary water-dissolvable materials that may be utilized to encapsulate the nano-particles are described in U.S. Pat. Nos. 4,961,790 and 5,783,541, the relevant disclosures of which are incorporated herein by reference.

In accordance with exemplary embodiments, the cement compositions of the present invention may utilize a packing volume fraction suitable for a particular application as desired. As used herein, the term "packing volume fraction" refers to the volume of the particulate materials in a fluid divided by the total volume of the fluid. The size ranges of the preferred particulate materials are selected, as well as their respective proportions, in order to provide a maximized packing volume fraction so that the fluid is in a hindered settling state. It is known that, in such a state, the particulate materials behave "collectively" like a porous solid material. The hindered settling state is believed to correspond, in practice, to a much higher solid material concentration in the fluid than that present in the some traditional cement compositions.

The present embodiments may include a combination of at least three features to obtain a maximum packing volume fraction. One is the use of at least three particulate materials wherein the at least three particulate materials are in size ranges "disjointed" from one another. In some embodiments, each of the three particulate materials may include a different particle size selected from the following ranges: about 7 nm to about 50 nm, about 0.05 microns to about 0.5 microns, 0.5 microns to about 10 microns, about 10 microns to about 20 microns, about 20 microns to about 200 microns, about 200 microns to about 800 microns, and greater than about 1 millimeter. For example, a first particulate material may include particles sized from about 7 nm to about 50 nm, a second particulate material may include particles sized from about 0.05 microns to about 0.5 microns, and a third particulate material may include particles sized from about 10 microns to about 20 microns. In accordance with present embodiments, the first particulate material includes at least one of nano-silica, nano-alumina, nano-zinc oxide, nano-boron, nano-iron oxide or combinations thereof. Another feature of present embodiments may include a choice of the proportions of the three particulate materials in relation to the mixing, such that the fluid, when mixed, is in a hindered settling state. Another feature may include the choice of the proportions of the three particulate materials between each other, and according to their respective size ranges, such that the maximum packing volume fraction is at least substantially achieved for the sum total of all particulate materials in the fluid system. Packing volume fraction is described in further detail in U.S. Pat. Nos. 5,518,996 and 7,213,646, the relevant portions of which are incorporated herein by reference.

Completion Fluid Embodiments

As previously mentioned, the nano-particles may be included in completion fluids in accordance with embodiments of the present invention. The nano-particles may be included in the completion fluids to provide a number of different benefits. For example, the nano-particles may be used to enhance or otherwise improve the rheological properties of the completions fluids. By way of further example, the nano-particles may be included in the completion fluids as weighting materials to increase the density of the fluid. Because the nano-particles are nano-sized, it is believed that they should not undesirably plug formation permeability or other downhole equipment, such as production screens, and thus can be included in completion fluids. In addition, the inclusion of the nano-particles in completion fluids may have further beneficial effects, especially in shale formations. For example, it is believed that the nano-particles may prevent the influx of well bore fluids into the nano-porosity often found within shale formations, such as oil shales, by sealing these pores, which isolates and stabilizes the shale formation from the destabilizing hydraulic forces from the well bore.

An exemplary embodiment of the completion fluids may comprise nano-particles. Generally, the "nano-particles" may be defined as having a mean particle size of less than 1 micron. For example, nano-particles may have a mean particles size in a range of from about 1 nm to less than 1 micron. In some embodiments, the nano-particles may have a mean particles size in a range of from about 1 nm to about 800 nm and, alternatively, from about 1 nm to about 100 nm. In one particular embodiment, the nano-particles may have a mean particle size in a range of about 20 nm to about 100 nm. In specific embodiments, the nano-particles may have a particle size of about 1 nm, about 10 nm, about 50 nm, about 100 nm, about 200 nm, about 400 nm, about 600 nm, or about 800 nm. In some embodiments, the nano-particles may be provided in colloidal form, for example, a colloidal nano-particle or a suspension of the nano-particle in a fluid. In some embodiments, the nano-particle may be a particulate nano-particle. The nano-particles may be encapsulated or otherwise contained as discussed above. Examples of suitable nano-particles include nano-alumina, nano-zinc oxide, nano-boron, nano-iron oxide, and nano-silica. Additional examples of suitable nano-particles include other nano-sized materials, including nano-barium sulphate, nano-manganese tetraoxide, nano-magnesium oxide, nano-calcium carbonate, nano-graphite, nano-barium oxide, nano-cerium oxide, nano-lanthium oxide, nano-titanium dioxide, nano-clay, and nano-aluminosilicates. Combinations of different nano-particles may also be used. In some embodiments, the nano-particle is not acid-soluble.

The nano-particles may be included in a completion fluid in an amount sufficient for a desired application. For example, the nano-particles may be included in a completion fluid in an amount sufficient to weight the fluid to a desired density. In some embodiments, the nano-particles may be present in the completion fluid in an amount in a range of from about 0.1% to about 70% by volume of the completion fluid. In specific embodiments, the nano-particles may be present in an amount ranging between any of and/or including any of about 0.1%, about 1%, about 10%, about 20%, about 30%, about 40%, about 50%, about 60%, or about 70% by volume of the completion fluid. One of ordinary skill in the art, with the benefit of this disclosure, should be able to select an appropriate amount of the nano-particles to use for a particular application.

In some embodiments, the completion fluids may comprise a base fluid, such as an oil-based fluid or a water-based fluid. Oil-based fluids may comprise olefins, internal olefins, alkanes, aromatic solvents, cycloalkanes, liquefied petroleum gas, kerosene, diesel oils, crude oils, heavy oils, gas oils, fuel oils, paraffin oils, mineral oils, low toxicity mineral oils, esters, amides, synthetic oils (e.g., polyolefins), polydiorganosiloxanes, siloxanes, organosiloxanes, ethers, acetals, dialkylcarbonates, hydrocarbons, and combinations thereof. Water-based fluids may comprise fresh water or salt water, such as a brine or seawater. The base fluid may be present in an amount in a range of from about 25% to about 99% by volume of the completion fluid.

Other additives suitable for use in completion operations may also be included in the completion fluids in embodiments of the present invention. Examples of such additives includes salts, surfactants, fluid-loss-control additives, gases such as nitrogen or carbon dioxide, surface-modifying agents, foamers, corrosion inhibitors, scale inhibitors, clay-control agents, biocides, friction reducers, antifoam agents, dispersants, flocculants, $H_2S$ scavengers, $CO_2$ scavengers, oxygen scavengers, lubricants, viscosifiers, breakers, wetting agents, and combinations thereof. A person having ordinary skill in the art, with the benefit of this disclosure, should readily be able to determine the type and amount of additive useful for a particular application.

The completion fluids may have a density as desired for a particular application. In general, the completion fluid should have a density sufficient to, for example, control formation pressures. As previously described, the nano-particles may be used in some embodiments as weighting agents to increase the density of the completion fluid. For example, the nano-particles may be included in the completion fluid in an amount sufficient to weight the completion fluid. In some embodiments, the completion fluid may have a density in the range of from about 7.5 lb/gal to about 22 lb/gal, and alternatively from about 12 lb/gal to about 18 lb/gal. One of ordinary skill in the art, with the benefit of this disclosure, should be able to determine an appropriate density of the completion fluid for a particular application.

As will be appreciated by those of ordinary skill in the art, with the benefit of this disclosure, embodiments of the completions fluids of the present invention may be used in a variety of completion operations. For example, the completion fluids may be used in operations after drilling, but before the start of production. In some embodiments, the completion operation may include preparing the bottom of the well bore to the required specifications, running in production tubing and its associated downhole equipment, or carrying out production enhancement operations. By way of example, the completion fluid may be present in the well bore while equipment, such as screens, production liners, and/or downhole valves, is run into the well bore. In one embodiment, the completion fluid may be present in the well bore while perforations are formed in the casing disposed in the well bore. Among other functions, the completion fluid should act to control formation pressures.

An embodiment of the present invention may comprise a method of completing a well that comprises providing a completion fluid comprising nano-particles and introducing the completion fluid into a well bore. In some embodiments, downhole equipment may be run into the well while the completion fluid is in the well bore. The downhole equipment may include, for example, screens, production liners, and/or downhole valves. One particular example of a type of downhole equipment that is susceptible to plugging by solids-laden fluids, such as drilling fluids, is wire-wrapped screens. Wire-wrapped screens may be used, for example, where a well bore liner having a porous screen may be required to mechanically hold back the formation sand. Because the nano-particles are nano-sized, the nano-particles should not undesirably plug the downhole equipment. In contrast, if micron-sized or larger particles are included in the completion fluids, the downhole equipment, as well as the formation permeability, would be susceptible to plugging events.

To facilitate a better understanding of the present technique, the following examples of some specific embodiments are given. In no way should the following examples be read to limit, or to define, the scope of the invention.

EXAMPLE 1

Five different cement slurries (i.e., Slurry A, Slurry B, Slurry C, Slurry D and Slurry E) were prepared. The slurries and resulting set cements were then tested to determine setting or thickening times and other physical properties of each of the five different slurries. As set forth below, the respective test results for the five different slurries demonstrate that inclusion of particulate nano-silica in the slurry reduces the set time and increases the strength of the resulting cement relative to cements resulting from inclusion of the other silica components that were tested.

Slurries A, B, C and D were prepared by dry blending dry components with cement prior to adding water to form the respective slurry. Slurry E was prepared by dry blending dry components with cement prior to adding water and then adding colloidal silica to form the respective slurry. Further, each of the five slurries included a different type of silica. Two of the five slurries included particulate nano-silica in accordance with present embodiments, and the other three included silica in different forms and sizes (e.g., colloidal silica and micro-silica). While the silica included in each of the five slurries was different, the other components utilized in each of the five slurries were similar. Specifically, in addition to a specific type of silica, each of the five slurries included 100% bwoc of Class G cement, 0.5% bwoc of a retarder, and sufficient water to make the density of the slurry approximately 12.00 lbs/gal. The specific retarder utilized in the slurries was HR-5 cement retarder, which is a sulfomethylated lignosulfonate. It should be noted that HR5 cement retarder is available from Halliburton Energy Services, Inc. and is described in U.S. Pat. No. RE31,190.

As set forth above, each of the five slurries included a different type of silica and sufficient water to make the resulting slurry have a density of 12.00 lb/gal. Slurries A and B included particulate nano-silica in accordance with present embodiments and 15.36 gal/sk of water. Specifically, Slurry A included 15% bwoc of particulate nano-silica having a particle size of approximately 30 nm, and Slurry B included particulate nano-silica having a particle size of approximately 10 nm. Slurry C included 15% bwoc of SILICALITE cement additive and 15.68 gal/sk of water. SILICALITE (compacted) cement additive, which is available from Halliburton Energy Services, Inc., Duncan, Okla., is an amorphous silica generally sized in a range from about 2.5 microns to about 50 microns. Slurry D included 15% bwoc of MICROSAND cement additive and 15.77 gal/sk of water. MICROSAND cement additive, which is available from Halliburton Energy Services, Inc., Duncan, Okla., is a crystalline silica ground to a substantially uniform particle size distribution of approximately 5 to 10 microns. Slurry E included 5.12 gal/sk of GasCon 469™ lightweight cement additive and 10.09 gal/sk of water. GASCOND 469 lightweight cement additive is available from Halliburton Energy Services, Inc., Duncan, Okla., and may be defined as a colloidal silicic acid suspension containing suspended silicic acid particles generally having a particle size of less than about 20 nm.

After the five slurries were prepared, tests were performed to determine various physical characteristics associated with inclusion of the different silica components in each of the associated cement compositions. One of these tests was performed to measure a thickening time associated with each of the five slurries. Specifically, the total thickening time (TTT) associated with each cement slurry was determined by performing a thickening-time test in accordance with API Recommended Practice 10, *API Specification for Materials and Testing for Well Cements*. The measurement of the TTT for each slurry was based on the respective slurry reaching a consistency of 70 Bearden units (Bc) at 80° F. The results of these measurements are set forth for each of the five slurries in Table 1 below.

Additional tests were performed on the cement slurries to determine force-resistance properties (e.g., compressive strength, shear-bond strength, and tensile strength) for each of the slurries. Each of the force-resistance property tests was performed on the respective cement slurries at a temperature of 80° F. and after the slurries had set for 72 hours. The force-resistance property tests included nondestructive and destructive ultrasonic strength tests, a compressive-strength test, a shear-bond test, and a tensile-strength test. The nondestructive and destructive ultrasonic analyzer tests were conducted using a UCA ultrasonic cement analyzer to determine a $UCA_{72\ hrs}$ value and a $UCA_{crush}$ value, respectively. The compressive-strength tests and UCA analyzer tests were performed in accordance with API Recommended Practice 10B. Further, shear-bond and Brazilian-tensile-strength tests were performed to determine shear strength and tensile strength values, respectively, for the different cement compositions. The shear-bond-strength tests were performed as described in SPE 764 entitled "A Study of Cement—Pipe Bonding" by L. G. Carter and G. W. Evans. The Brazilian-tensile-strength tests were performed in accordance with ASTM C496-96. The results of the tests performed on each of the five compositions are shown in Table 1 below.

TABLE 1

| Slurry | Silica Type | TTT to 70 Bc (Hr:Min) | $UCA_{72\ hrs}$ (psi) | $UCA_{crush}$ (psi) | Comp. Strength (psi) | Shear-Bond Strength (psi) | Brazilian Tensile Strength (psi) |
|---|---|---|---|---|---|---|---|
| Slurry A | 30 nm particulate nano-silica | 2:43 | 328 | 419 | 428 | 169 | 148.28 |
| Slurry B | 10 nm particulate nano-silica | 5:00 | 500 | 481 | 402 | 51 | 14.72 |
| Slurry C | Amorphous silica | 14:32 | 266 | 206 | 211 | 98 | 95.5 |

TABLE 1-continued

| Slurry | Silica Type | TTT to 70 Bc (Hr:Min) | $UCA_{72\ hrs}$ (psi) | $UCA_{crush}$ (psi) | Comp. Strength (psi) | Shear-Bond Strength (psi) | Brazilian Tensile Strength (psi) |
|---|---|---|---|---|---|---|---|
| Slurry D | Crystalline Silica | 20:00+ | 260 | 285 | 252 | 37.2 | 102.16 |
| Slurry E | Colloidal Silica | 20:00+ | 225 | 219 | 374 | 42.4 | 84.71 |

EXAMPLE 2

Samples of Slurries A, C, D and E discussed above were also tested to determine various additional physical properties associated with the resulting set cements and to confirm relative differences demonstrated above. While different instruments and calibration settings were used in the additional testing of the slurries, the test data indicates that relative differences between the different slurries are similar to those differences illustrated in Example 1. Indeed, as indicated above in Example 1, the respective test results in Example 2 for the five different cements demonstrate that inclusion of particulate nano-silica in the cement composition increases the strength of the resulting cement relative to cements resulting from inclusion of the other silica components that were tested.

Three samples for each of the three conventional cement slurries (Slurry C, Slurry D, and Slurry E) and four samples of Slurry A were tested to determine compressive strength, Young's modulus, and Poisson's ratio. The compressive-strength tests were performed in accordance with API Specification 10. It should be noted that the compressive-strength measurements in Example 1 are different than those in Example 2 because different equipment and different calibrations were utilized. However, the relative differences between compressive strengths for each of the five slurries are similar. The Young's modulus and Poisson's ratio were statically determined by means of compression testing using a load frame. The Young's modulus or modulus of elasticity for each sample was obtained by taking a ratio of a simple tension stress applied to each sample to a resulting strain parallel to the tension in that sample. The Poisson's ratio for each sample was determined by calculating a ratio of transverse strain to a corresponding axial strain resulting from uniformly distributed axial stress below a proportional limit of each sample. The values determined for the three samples of each of the five different cement slurries are set forth below in Table 2.

TABLE 2

| Slurry | Sample | Silica Type | Compressive Strength (psi) | Young's Modulus | Poisson's Ratio |
|---|---|---|---|---|---|
| Slurry A | Sample 1 | 30 nm particulate nano-silica | 1257 | 2.26E+05 | ** |
| Slurry A | Sample 2 | 30 nm particulate nano-silica | 1189 | 2.12E+05 | 0.109 |
| Slurry A | Sample 3 | 30 nm particulate nano-silica | 1249 | 2.04E+05 | 0.092 |
| Slurry A | Sample 4 | 30 nm particulate nano-silica | 1275 | 2.13E+05 | 0.110 |
| Slurry C | Sample 1 | Amorphous silica | 466 | 2.53E+05 | 0.064 |
| Slurry C | Sample 2 | Amorphous silica | 483 | 2.38E+05 | 0.064 |
| Slurry C | Sample 3 | Amorphous silica | 506 | 2.40E+05 | 0.053 |
| Slurry D | Sample 1 | Crystalline Silica | 350 | 1.42E+05 | 0.068 |
| Slurry D | Sample 2 | Crystalline Silica | 397 | 1.50E+05 | 0.063 |
| Slurry D | Sample 3 | Crystalline Silica | 378 | 1.46E+05 | 0.060 |
| Slurry E | Sample 1 | Colloidal Silica | 514 | 1.03E+05 | 0.063 |
| Slurry E | Sample 2 | Colloidal Silica | 598 | 1.15E+05 | 0.072 |
| Slurry E | Sample 3 | Colloidal Silica | 627 | 1.23E+05 | 0.071 |

The particular embodiments disclosed above are illustrative only, as the present invention may be susceptible to various modifications and alternative forms. However, it should be understood that the invention is not intended to be limited to the particular embodiments disclosed. Rather, the present invention is to cover all modifications, equivalents and alternatives falling with the scope and spirit of the present invention as defined by the following appended claims. In addition, every range of values (of the form, "from about a to about b," or, equivalently, "from approximately a to b," or, equivalently, "from approximately a-b") disclosed in the present Description of Specific Embodiments is to be understood as referring to the power set (the set of all subsets) of the respective range of values, and set for the every range encompassed within the broader range of value.

What is claimed is:
1. A method of completing a well comprising:
   including nano-particles in a completion fluid, wherein the nano-particles are selected from the group consisting of nano-silica, nano-alumina, nano-zinc oxide, nano-boron, nano-iron oxide, nano-barium sulphate, nano-manganese tetraoxide, nano-magnesium oxide, nano-calcium carbonate, nano-graphite, nano-barium oxide, nano-cerium oxide, nano-lanthium oxide, nano-titanium dioxide, nano-clay, nano-aluminosilicate, and any combination thereof;
   wherein the nano-particles are present in the completion fluid in an amount in a range of from about 10% to about 70% by weight of the completion fluid; and wherein the completion fluid has a density in a range of about 7.5 pounds per gallon to about 22 pounds per gallon;
   introducing the completion fluid into a well bore; and using the completion fluid in completing the well, wherein micron-sized or larger particles are not present in the completion fluid when completing the well such that the completion fluid does not plug production screens or other downhole equipment.

2. The method of claim 1 wherein the nano-particles have a particle size in a range of from about 1 nanometer to less than 1 micron.

3. The method of claim 1 wherein the nano-particles have a particle size in a range of from about 1 nanometer to about 100 nanometers.

4. The method of claim 1 wherein the completion fluid comprises at least one base fluid selected from the group consisting of an oil-based fluid, a water-based fluid, and a combination thereof.

5. The method of claim 1 wherein the completion fluid comprises at least one oil-based fluid selected from the group consisting of an olefin, an internal olefin, an alkane, an aromatic solvent, a cycloalkane, liquefied petroleum gas, kerosene, diesel oil, crude oil, heavy oil, gas oil, fuel oil, paraffin oil, mineral oil, low toxicity mineral oil, an ester, an amide, a polyolefin, a polydiorganosiloxane, a siloxane, an organosiloxane, an ether, an acetal, a dialkylcarbonate, a hydrocarbon, and any combination thereof.

6. The method of claim 1 wherein the completion fluid further comprises at least one additive selected from the group consisting of a salt, a surfactant, a fluid-loss-control additive, a gas, nitrogen, carbon dioxide, a surface-modifying agent, a foamer, a corrosion inhibitor, a scale inhibitor, a clay-control agent, a biocide, a friction reducer, an antifoam agent, a dispersant, a flocculant, $H_2S$ scavenger, $CO_2$ scavenger, an oxygen scavenger, a lubricant, a viscosifier, a breaker, a wetting agent, and any combination thereof.

7. The method of claim 1 further comprising running downhole equipment into the well while the completion fluid is in the well.

8. The method of claim 1 further comprising running a wire-wrapped screen into the well while the completion fluid is in the well.

9. A method of completing a well comprising:
providing a cement-free completion fluid comprising nano-particles, wherein the nano-particles are selected from the group consisting of nano-silica, nano-alumina, nano-zinc oxide, nano-boron, nano-iron oxide, nano-barium sulphate, nano-manganese tetraoxide, nano-magnesium oxide, nano-calcium carbonate, nano-graphite, nano-barium oxide, nano-cerium oxide, nano-lanthium oxide, nano-titanium dioxide, nano-clay, nano-aluminosilicate, and any combination thereof; wherein the nano-particles are present in the completion fluid in an amount in a range of from about 10% to about 70% by weight of the completion fluid; and wherein the completion fluid has a density in a range of about 7.5 pounds per gallon to about 22 pounds per gallon;
introducing the cement-free completion fluid into a well bore and;
using the cement-free completion fluid in completing the well, wherein micron-sized or larger particles are not present in the cement-free completion fluid when completing the well such that the cement-free completion fluid does not plug production screens or other downhole equipment.

10. The method of claim 9 wherein the nano-particles have a particle size in a range of from about 1 nanometer to less than 1 micron.

11. The method of claim 9 wherein the nano-particles have a particle size of from about 1 nanometer to about 100 nanometers.

12. The method of claim 9 wherein the completion fluid comprises at least one base fluid selected from the group consisting of an oil-based fluid, a water-based fluid, or a combination thereof.

13. The method of claim 9 wherein the completion fluid comprises at least one oil-based fluid selected from the group consisting of an olefin, an internal olefin, an alkane, an aromatic solvent, a cycloalkane, liquefied petroleum gas, kerosene, diesel oil, crude oil, heavy oil, gas oil, fuel oil, paraffin oil, mineral oil, low toxicity mineral oil, an ester, an amide, a polyolefin, a polydiorganosiloxane, a siloxane, an organosiloxane, an ether, an acetal, a dialkylcarbonate, a hydrocarbon, and any combination thereof.

14. The method of claim 9 wherein the completion fluid further comprises at least one additive selected from the group consisting of a salt, a surfactant, a fluid-loss-control additive, a gas, nitrogen, carbon dioxide, a surface-modifying agent, a foamer, a corrosion inhibitor, a scale inhibitor, a clay-control agent, a biocide, a friction reducer, an antifoam agent, a dispersant, a flocculant, $H_2S$ scavenger, $CO_2$ scavenger, an oxygen scavenger, a lubricant, a viscosifier, a breaker, a wetting agent, and any combination thereof.

15. The method of claim 9 further comprising running downhole equipment into the well bore while the completion fluid is in the well bore.

16. The method of claim 9 further comprising running a wire-wrapped screen into the well bore while the completion fluid is in the well bore.

17. A method of completing a well comprising:
including nano-particles having a particle size of from about 1 nanometer to about 100 nanometers in a cement-free completion fluid, wherein the nano-particles comprise at least one nano-particle selected from the group consisting of nano-alumina, nano-zinc oxide, nano-boron, nano-iron oxide, nano-silica, nano-barium sulphate, nano-manganese tetraoxide, nano-magnesium oxide, nano-calcium carbonate, nano-graphite, nano-barium oxide, nano-cerium oxide, nano-lanthium oxide, nano-titanium dioxide, nano-clay, nano-aluminosilicate, and any combination thereof; wherein the nano-particles are present in the completion fluid in an amount in a range of from about 10% to about 70% by weight of the completion fluid; and wherein the completion fluid has a density in a range of about 7.5 pounds per gallon to about 22 pounds per gallon;
introducing the cement-free completion fluid into a well bore;
using the cement-free completion fluid in completing the well, wherein micron-sized or larger particles are not present in the cement-free completion fluid such that the cement-free completion fluid does not plug production screens or other downhole equipment; and
running downhole equipment into the cement-free completion fluid in the well.

* * * * *